US008686689B2

(12) United States Patent
Lee

(10) Patent No.: US 8,686,689 B2
(45) Date of Patent: Apr. 1, 2014

(54) BATTERY ASSEMBLY

(75) Inventor: Sang-Joo Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 510 days.

(21) Appl. No.: 12/879,975

(22) Filed: Sep. 10, 2010

(65) Prior Publication Data

US 2011/0127966 A1    Jun. 2, 2011

Related U.S. Application Data

(60) Provisional application No. 61/265,265, filed on Nov. 30, 2009.

(51) Int. Cl.
*H02J 7/00*    (2006.01)

(52) U.S. Cl.
USPC ............ 320/112; 429/177; 429/178; 429/179

(58) Field of Classification Search
CPC ........................................................ Y02E 60/12
USPC ........................................................ 429/179
See application file for complete search history.

(56) References Cited

U.S. PATENT DOCUMENTS

| 2005/0208345 | A1* | 9/2005 | Yoon et al. | 429/7 |
|---|---|---|---|---|
| 2008/0107962 | A1 | 5/2008 | Uh | |
| 2009/0111004 | A1* | 4/2009 | Jang et al. | 429/61 |
| 2009/0111018 | A1* | 4/2009 | Park et al. | 429/179 |
| 2009/0155631 | A1 | 6/2009 | Baek et al. | |
| 2010/0075205 | A1* | 3/2010 | Kwag et al. | 429/61 |
| 2010/0092859 | A1* | 4/2010 | Kim et al. | 429/178 |
| 2010/0098973 | A1 | 4/2010 | Lee et al. | |

FOREIGN PATENT DOCUMENTS

| CN | 2836245 Y | 11/2006 |
|---|---|---|
| CN | 2935489 Y | 8/2007 |
| CN | 2938420 Y | 8/2007 |
| CN | 101170198 A | 4/2008 |
| CN | 101459257 A | 6/2009 |
| CN | 201311952 Y | 9/2009 |
| CN | 101573807 A | 11/2009 |
| EP | 1 753 050 A2 | 8/2006 |
| JP | 11-162423 | 6/1999 |
| JP | 2003-059467 | 2/2003 |
| JP | 2006-164601 | 6/2006 |
| KR | 10-2009-0011994 | 2/2009 |
| KR | 2009-0011995 | 2/2009 |
| KR | 2009-0075396 | 7/2009 |
| KR | 2009-0075403 | 7/2009 |

(Continued)

OTHER PUBLICATIONS

Korean Office action dated Apr. 27, 2012 issued to corresponding Korean priority patent application No. 10-2010-0109848, 3 pages.

(Continued)

*Primary Examiner* — Edward Tso
*Assistant Examiner* — Ahmed Omar
(74) *Attorney, Agent, or Firm* — Christe, Parker & Hale, LLP

(57) ABSTRACT

A battery assembly includes a bare cell; a protection circuit module electrically connected to the bare cell and having a first terminal portion; a holder case between the bare cell and the protection circuit module, the holder case having a second terminal portion, a terminal connection portion connected to the second terminal portion and an insulating support, wherein the protection circuit module is coupled to the holder case such that the first terminal portion is electrically coupled to the terminal connection portion.

15 Claims, 7 Drawing Sheets

(56) References Cited

FOREIGN PATENT DOCUMENTS

WO    WO 2007/046579 A1    4/2007

OTHER PUBLICATIONS

EPO Extended Search Report for corresponding European Patent Application No. 10251905.5, dated Mar. 18, 2011.

KIPO Notice of Allowance dated Oct. 30, 2012, for corresponding Korean Patent application 10-2010-0109848, (1 page).

JPO Office action dated Dec. 19, 2012, for corresponding Japanese Patent application 2010-261056, (5 pages).

SIPO Office action dated Feb. 1, 2013, with English translation, for corresponding Chinese Patent application 201010570766.5, (13 pages).

* cited by examiner

BATTERY ASSEMBLY

CROSS-REFERENCE TO RELATED APPLICATION

This application claims the benefit of U.S. Provisional Application No. 61/265,265, filed on Nov. 30, 2009, in the United States Patent and Trademark Office, the disclosure of which is incorporated herein in its entirety by reference.

BACKGROUND

1. Field

Aspects of the present invention relate to a battery assembly, and more specifically, to a rechargeable battery assembly 2. Description of Related Art A secondary battery pack often includes a chargeable/dischargeable bare cell, a protection circuit module (PCM) that is electrically coupled to the bare cell to control charging/discharging and break a circuit in overcharging/overdischarging, a holder case that is positioned between the bare cell and the protection circuit module, and a top case molded to a shape mountable on an external apparatus by packing the bare cell and the protection circuit module.

The holder case serves to electrically insulate an area where the bare cell and the protection circuit module are in contact with each other excluding an area where positive and negative electrodes of the bare cell and the protection circuit module are electrically coupled to each other. The protection circuit module is usually seated on the top of the holder case. In addition, the bare cell and the protection circuit module are integrally packed by using the top case having a shape mountable on the external apparatus.

An external input/output terminal portion is typically formed at one side of the protection circuit module in the battery pack and a terminal exposure portion is formed in the top case that is in contact with the external input/output terminal portion to expose the external input/output terminal portion. However, when the external input/output terminal portion of the pack and the protection circuit module are integrally assembled at the time of assembling the battery pack, in the case of a pad type battery, shaking of the terminal may be relatively insignificant, but in a battery type in which the terminal of the pack is projected, if the terminal portion is shaken or if the protection circuit module is not securely fixed to the battery assembly, even though the top case may later be assembled to pack the bare cell and the protection circuit module, the protection circuit module may be bent or dislodged.

SUMMARY

Accordingly, embodiments provide a battery assembly that includes a holder case having a new structure in which a protection circuit module can be securely coupled to a holder case by sliding or by fitting.

Further, the embodiments provide a battery assembly capable of preventing the protection circuit module from being dislodged by securely fixing the protection circuit module to the holder case and omitting a process of attaching the protection circuit module to the holder case at the time of assembling the battery pack.

According to an aspect of the present invention, a battery assembly includes a bare cell; a protection circuit module electrically connected to the bare cell and having a first terminal portion; a holder case between the bare cell and the protection circuit module, the holder case having a second terminal portion, a terminal connection portion connected to the second terminal portion and an insulating support, wherein the protection circuit module is coupled to the holder case such that the first terminal portion is electrically coupled to the terminal connection portion.

In one embodiment, the second terminal portion is on the insulating support and the terminal connection portion is spaced from the insulating support. Further, a pad portion of the protection circuit module may be between the terminal connection portion and the insulating support, wherein the pad portion includes the first terminal portion.

In one embodiment, the insulating support includes a support portion configured to secure the position of the protection circuit module on the insulating support. Additionally, the protection circuit module has a projection portion configured to secure the protection circuit module to the holder case.

The battery assembly may further include an electrode terminal on the bare cell; a first connection tab electrically connecting the protection circuit module to the electrode terminal; and a second connection tab electrically connecting the protection circuit module to the bare cell. Additionally, the holder case and the protection circuit module may have an opening adapted to allow the second connection tab to be welded to the bare cell. In one embodiment, the first terminal portion and the terminal connection portion are welded together and the holder case may be coupled to the bare cell by an insulating tape. Further, the protection circuit module comprises a flexible printed circuit board.

In one embodiment, the holder case has a rib extending along each longitudinal edge of a surface of the holder case that contacts the bare cell and the rib may extend along only a portion of each longitudinal edge. Additionally, the battery assembly may include a top case substantially covering the protection circuit module and adapted to expose the second terminal portion. Further, a label may be included to substantially cover the bare cell and the top case.

In one embodiment, the protection circuit module further includes a second connection tab between the ribs and between the holder case and the bare cell and may also include a positive temperature coefficient member between the electrode terminal and the protection circuit module.

BRIEF DESCRIPTION OF THE DRAWINGS

The accompanying drawings, together with the specification illustrate exemplary embodiments of the present invention, and, together with the description, serve to explain the principles of embodiment of the present invention.

DETAILED DESCRIPTION

Figure 1:
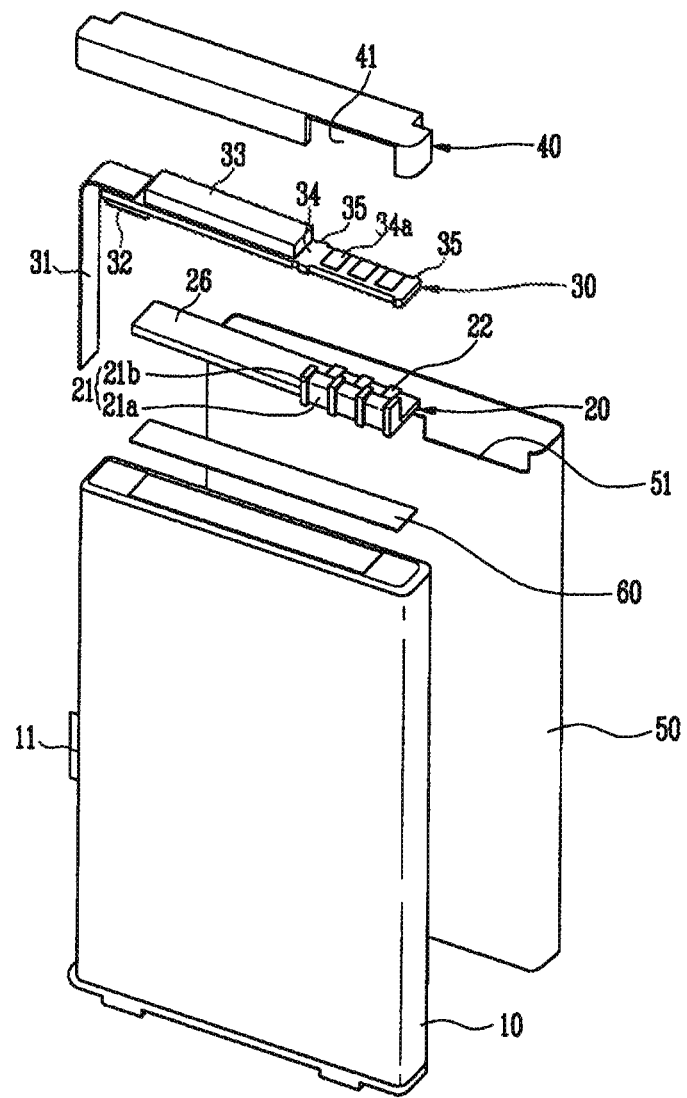
FIG. 1 is an exploded perspective view showing a battery assembly according to an embodiment of the present invention.

Hereinafter, certain exemplary embodiments of the present invention will be described with reference to the accompanying drawings. When a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, a battery assembly according to embodiments of the present invention will be described in detail with reference to the accompanying drawings illustrating embodiments of the present invention.

When a bare cell and a protection circuit module are coupled with each other the resulting structure is typically referred to as a core pack. In the following description, the term "core pack" is used to refer to a structure in which the bare cell, the protection circuit module, and a holder case positioned therebetween are coupled to each other.

FIG. 1 is an exploded perspective view showing a battery assembly according to an embodiment of the present invention.

Referring to FIG. 1, the battery assembly according to an embodiment of the present invention includes a bare cell 10, a holder case 20, a protection circuit module 30, a top case 40, and a label sheet 50. Herein, the protection circuit module 30 is electrically coupled with the bare cell 10. A pad portion 34 with an internal terminal portion 34a is formed at one side of the protection circuit module 30 and a circuit mounting portion 33 is formed at the other side of the protection circuit module 30. In addition, the holder case 20 is installed between the bare cell 10 and the protection circuit module 30. The holder case 20 includes a support 26, an external input/output terminal portion 21 formed on one surface of the support 26, and a terminal connection portion 22 connected with the external input/output terminal portion 21, such that the protection circuit module 30 is housed in and is fixed to the holder case 20 so that the internal terminal portion 34a of the protection circuit module 30 contacts the terminal connection portion 22.

According to embodiments, the bare cell 10 may have either a can shape or a pouch shape, but in the present embodiment of the present invention, the can-shaped bare cell will be described as an example.

The bare cell 10 includes an electrode assembly and a can housing the electrode assembly. The electrode assembly includes a positive plate coated with a positive active material on both surfaces thereof, a separator, and a negative plate coated with a negative active material on both surfaces thereof. Electrode tabs are joined to areas extending from the positive plate and the negative plate. One of the electrode tabs is connected to a can or to a cap plate and the other one is connected to an electrode terminal 11 and protrudes from the can to be electrically coupled with the protection circuit module 30. In order to electrically connect the protection circuit module 30 with the bare cell 10, a first connection tab 31 is formed at one end of the protection circuit module 30 and a second connection tab 32 is formed at a lower portion of the protection circuit module 30. As will be appreciated, directional terms such as "upper" and "lower" relate to the orientation of the battery assembly in the figures and the relative position of the recited components thereto.

The holder case 20 is attached to the bare cell 10 by an insulating tape 60. A body portion of the holder case 20 includes the support 26 that is formed by an insulator and supports the protection circuit module 30, the external input/output terminal portion 21, and the terminal connection portion 22 that is electrically and physically connected with the external input/output terminal portion 21. The external input/output terminal portion 21 is integrally formed on one side of the support 26 to serve as an electrical medium for transmitting and receiving an electrical signal between the bare cell 10 and an external apparatus.

Herein, the external input/output terminal portion 21 is circumscribed onto one surface of the support 26 and the terminal connection portion 22 is spaced from the top surface of the support 26 by a predetermined gap to form a space therebetween. The pad portion 34 with the internal terminal portion 34a of the protection circuit module 30 is then slidingly-inserted or fittingly-inserted into the above-described space.

Figure 2A:
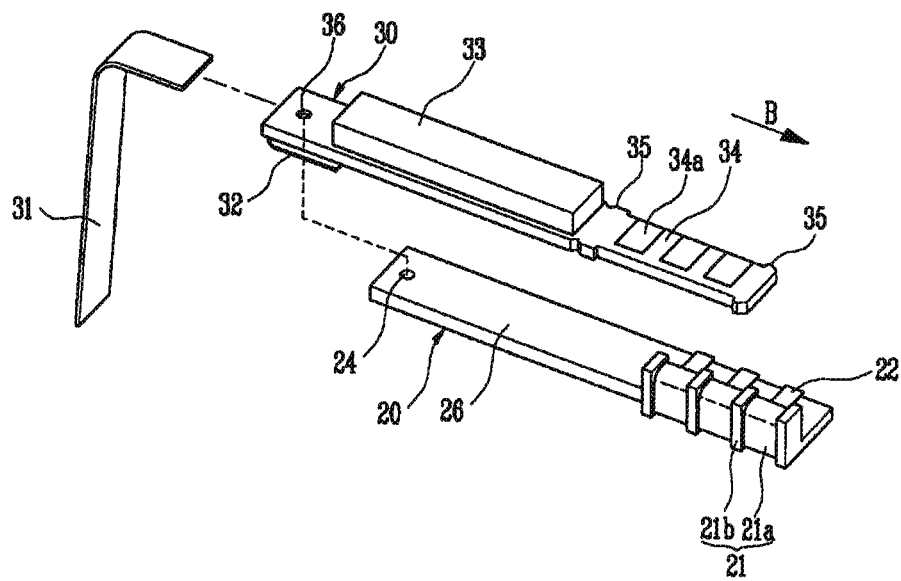
FIG. 2A is a perspective view of one embodiment more specifically showing the protection circuit module and the holder case of FIG. 1.
Figure 2B:
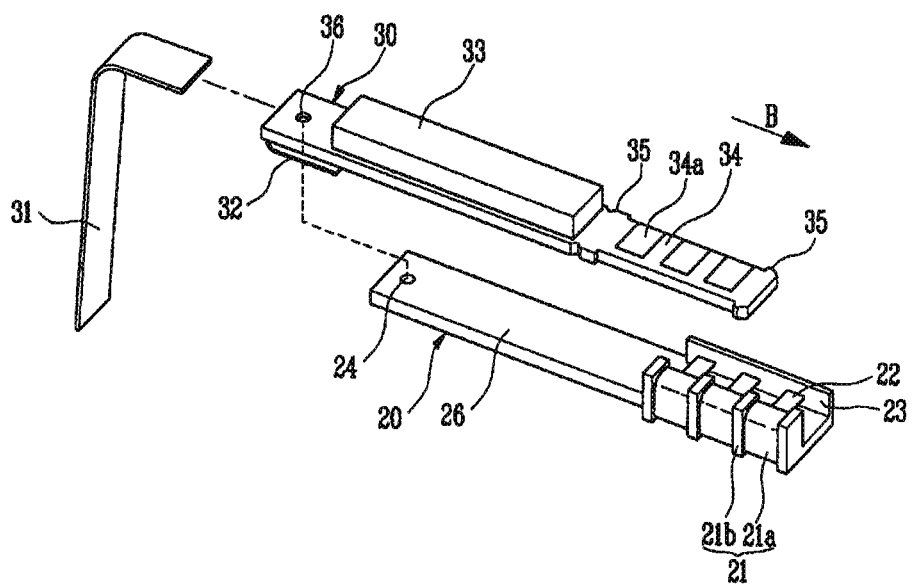
FIG. 2B is a perspective view of another embodiment of the protection circuit module and the holder case of FIG. 1.

Further, as shown in FIG. 2B described below, a support portion 23 is further provided at a position facing the external input/output terminal portion 21. In this configuration, the pad portion 34 with the internal terminal portion 32a of the protection circuit module 30 is inserted into the lower portion of the terminal connection portion 22 between the external input/output terminal portion 21 and the support portion 23 to contact the bottom of the terminal connection portion 22. A detailed description thereof will be made below in more detail.

In addition, in an embodiment of the present invention, the external input/output terminal portion 21 is circumscribed onto one surface of the support 26 and in the embodiment, one surface of the support 26 vertically extends to be circumscribed to the external input/output terminal portion 21, which is projected to one upper side of the bare cell. Herein, a part that extends upwards on one surface of the support 26 and is not circumscribed to a metal portion 21a of the external input/output terminal portion 21 will be referred to as a longitudinal extension portion (or insulating portion) 21b and separately described.

That is, the external input/output terminal portion 21 includes the insulating portion 21b and the metal portion 21a circumscribed to one portion of the insulating portion 21b. Herein, the metal portion 21a is plated with a conductive material, e.g., gold (Au), Copper (Cu), etc. to allow an electrical signal to flow between the bare cell 10 and the external apparatus. In addition, the insulating portion 21b is made of a plastic material, which is an insulating material, to serve to inter-insulate the metal portions 21a interposed in the insulating portion 21b by regular intervals.

Further, a circuit mounting portion 33 is further provided on a printed circuit board of the protection circuit module 30 that is seated and fixed to the holder case 20. A protection circuit is formed in the circuit mounting portion 33, such as a circuit for uniformly maintaining a charging state of the battery or a circuit for preventing overdischarging and overcharging by controlling charging and discharging of the battery. Further, the protection circuit module 30 may include a protection element such as a thermistor or a temperature fuse. The safety devices prevent risks such as explosion, firing, etc. of the battery by cutting current when the voltage and current of the battery rise over a standard or more due to an increase in high temperature or excessive charging/discharging of the battery.

In addition, an internal terminal portion 34a of the protection circuit module 30 may be inserted into and fixed to the lower portion of the terminal connection portion 22 on the top of the support 26 of the holder case 20. Therefore, a projection portion 35 is additionally formed in the protection circuit module 30 that is in contact with both end portions of the external input/output terminal portion 21. The protection portion 35 allows the protection circuit module 30 inserted between the terminal connection portion 22 and the holder case 20 to be securely fixed to the holder case 20. The structure in which the protection circuit module 30 is fixed to the holder case 20 will be described in detail with reference to FIGS. 3 to 5.

The top case 40 that covers the protection circuit module 30 connected to the bare cell 10 and forms a part of an exterior of the battery assembly is coupled to the core pack. Further, the label sheet 50 covering parts of outer portions of the bare cell 10 and the top case 40 is further formed in the core pack. By this configuration, it is possible to enforce the coupling force between the bare cell 10 and the top case 40. In addition, a terminal exposure portion 41 and a groove portion 51 for exposing the external input/output terminal portion 21 to the outside are provided in the top case 40 and the label sheet 50, respectively.

FIG. 2A is a perspective view more specifically showing the protection circuit module and the holder case of FIG. 1.

Referring to FIG. 2A, the internal terminal portion 34a of the protection circuit module 30 is slidingly-inserted between the holder case 20 and the terminal connection portion 22 in a B direction to contact the lower part of the terminal connection portion 22 of the holder case 20. The insertion direction is shown as one example. Besides, the internal terminal portion 34a may be inserted and coupled in an opposite direction to the external input/output terminal portion 21 of the holder case 20 by a forced-fitting scheme or various joining methods.

A first connection tab 31 for connecting the electrode terminal 11 (see FIG. 1) of the bare cell 10 (see FIG. 1) is formed on one end of the protection circuit module 30 and a second connection tab 32 for connecting an outer surface of the bare cell 10 is formed on a lower portion of the protection circuit module 30. The bare cell 10 and the protection circuit module 30 may be electrically coupled by the first connection tab 31 and the second connection tab 32.

In one embodiment, the second connection tab 32 is attached onto the outer surface of the bare cell 10 by welding. For this, a first hole (or opening) 24 and a second hole (or opening) 36 are formed at portions of the holder case 20 and the protection module 30 where the second connection tab 32 is positioned, respectively. In this configuration, when the second connection tab 32 is welded to the bare cell 10, the second connection tab 32 may be easily welded while being exposed outside.

FIG. 2B is a modified embodiment of FIG. 2A. As shown in the figure, an additional support portion 23 is further provided at a position facing the external input/output terminal portion 21 of the holder case 20. The pad portion 34 with the internal terminal portion 34a serves to guide the protection circuit module 30 to be inserted into the lower portion of the terminal connection portion 22 between the external input/output terminal portion 21 and the support portion 23. In addition, the support portion 23 can support the protection circuit module 30 to be more securely mounted on the holder case 20.

Figure 3A:
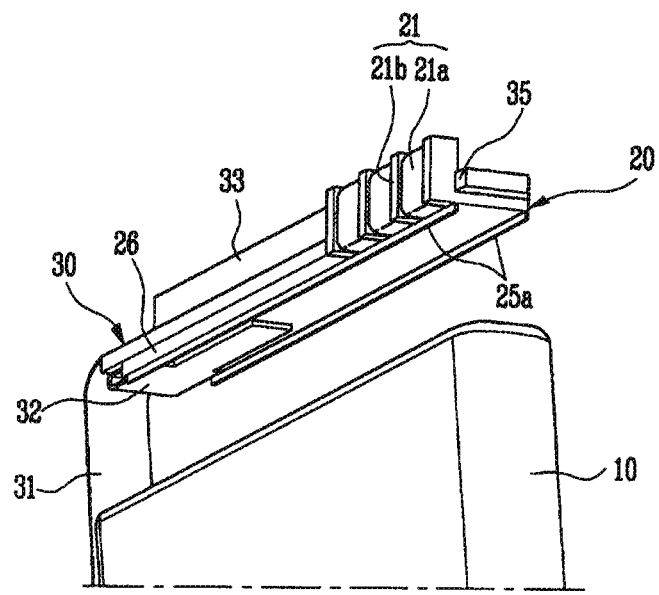
FIG. 3A is a bottom perspective view showing a state where a protection circuit module and a holder case are coupled with each other according to an embodiment of the present invention.

FIG. 3A is a bottom perspective view showing a state where a protection circuit module and a holder case are coupled with each other according to an embodiment of the present invention.

Referring to FIG. 3A, the holder case 20 may be attached to the bare cell 10 by using various methods such as an adhesive tape, welding, or the like. In one embodiment, a pair of ribs 25a are additionally formed to extend generally along edges of the bottom of the holder case 20, that is, the bottom of the support 26. The second connection tab 32 formed at one lower portion of the protection circuit module 30 may be seated between the pair of ribs 25a. The pair of ribs 25a may be used to create a seating space for a secondary plate such as the second connection tab 32.

Further, it is possible to seat the holder case 20 at an accurate position of the bare cell 10 by using the ribs 25a to guide the holder case to the correct position. That is, the ribs 25a on the bottom of the holder case 20 are formed to cover the upper exterior of the bare cell 10, such that it is possible to facilitate position alignment and improve shape synthesis at the time of coupling the bare cell 10 with the holder case 20.

In addition, a base material of the protection circuit module 30 of the present invention may be formed by a flexible printed circuit board (FPCB). As a result, it is possible to reduce the height of the protection circuit module 30 to implement a more compact battery assembly.

Figure 3B:
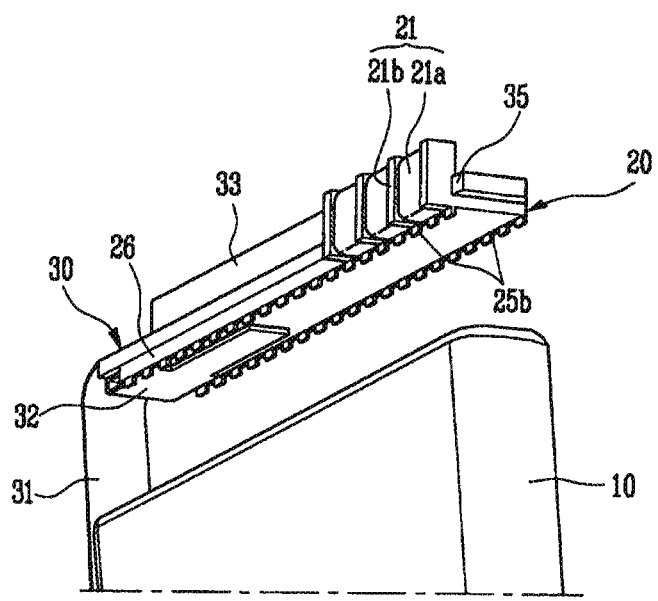
FIG. 3B is a perspective view of another embodiment showing the state where the protection circuit module and the holder case are coupled with each other.

FIG. 3B is another modified example of FIG. 3A. In FIG. 3B, the pair of ribs 25b are formed along edges of the bottom of the support 26, but they may be spaced from either end of the bottom of the support 26. Although partially spaced as described above, an additional plate such as the second connection tab 32 may still be seated below the support 26, and the ribs may still provide a space large enough to stably support the protection circuit module 30 against movement on the top of the bare cell 10.

Figure 4A:
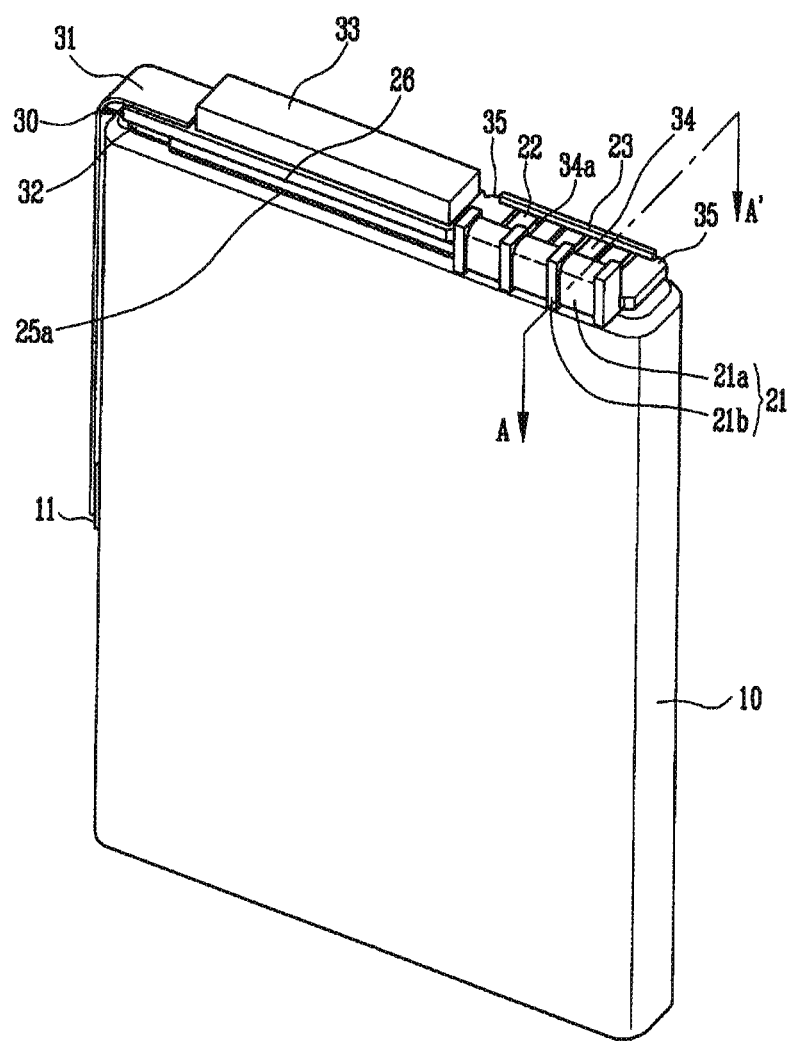
FIG. 4A is a perspective view showing a state where a protection circuit module and a holder case are coupled with each other according to an embodiment of the present invention.
Figure 4B:
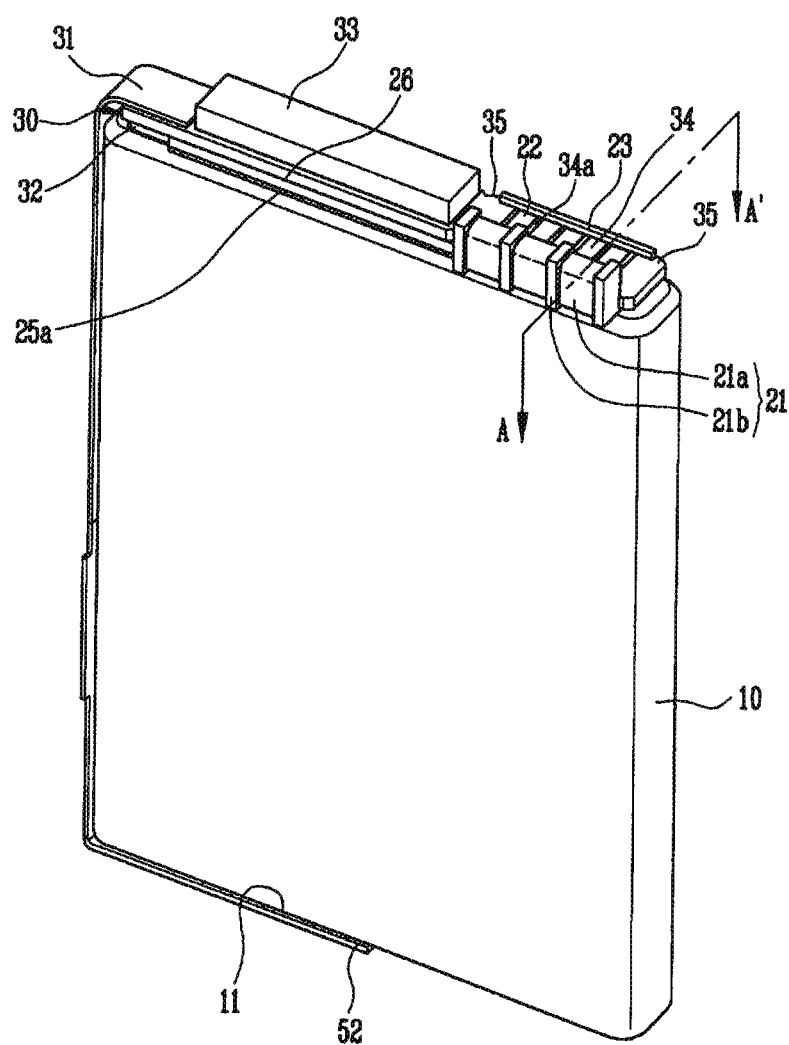
FIG. 4B is a perspective view of a battery assembly of yet another embodiment of the present invention.
Figure 5:
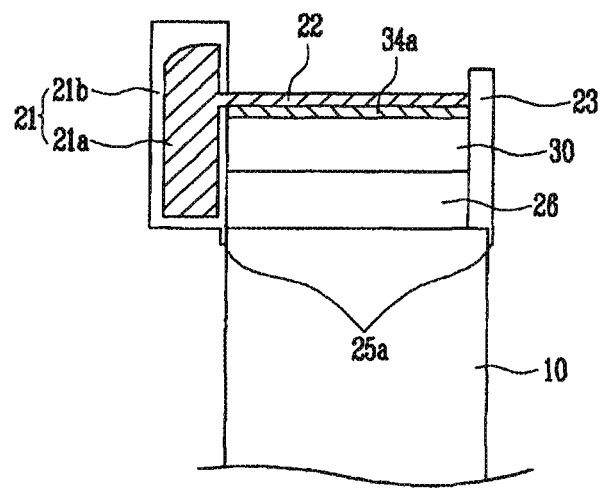
FIG. 5 is a cross-sectional schematic view taken along line A-A' of FIG. 4A.

FIG. 4 is a perspective view showing a state where a protection circuit module and a holder case are coupled with each other according to another embodiment of the present invention, FIG. 4B is a perspective view of a battery assembly of yet another embodiment of the present invention and FIG. 5 is a cross-sectional view taken along line A-A' of FIG. 4A.

Referring to FIGS. 4A, 4B and 5, the terminal connection portion 22 is supported by the support portion 23 formed on a surface of the holder case 20 facing the external input/output terminal portion 21 circumscribed onto one surface of the holder case 20. In this configuration, the terminal connection portion 22 is spaced from the support 26 of the holder case 20 by a predetermined gap.

The pad portion 34 formed at one end of the protection circuit module 30 is inserted between the holder case 20 and the terminal connection portion 22 that are spaced from each other as described above, such that the internal terminal portion 34a contacts the bottom of the terminal connection portion 22 and is electrically coupled thereto. Therefore, the internal terminal portion 34a may transmit the electrical signal from the bare cell 10 to the terminal connection portion 22. In addition, since the terminal connection portion 22 is connected to the external input/output terminal portion 21 exposed outside of the battery assembly, the electrical signal from the bare cell 10 may be transmitted to an external apparatus through the external input/output terminal portion 21.

That is, the internal terminal portion 34a of the protection circuit module 30 may transmit the electrical signal from the bare cell 10 to the external input/output terminal portion 21 of the holder case 20 through the terminal connection portion 22.

In addition, a projection portion 35 is formed in the protection circuit module 30 that is in contact with end portions of the external input/output terminal portion 21 and the support portion 23 in order to fix the protection circuit module 30 inserted between the holder case 20 and the terminal connection portion 22.

Since the projection portion 35 has a generally round shape, an interference fit is generated by pressure applied at the time of inserting the protection circuit module 30 into the holder case 20 and the projection portion 35 is fixed to the holder case 20. Therefore, the protection circuit module 30 is substantially prevented from being pushed or moved by fitting-coupling and fixing the protection circuit module 30 to the holder case 20 so as to substantially prevent the external input/output terminal portion 21 from being moved or dislodged. Further, by omitting the process of attaching the protection circuit module 30 to the holder case 20, the number of processes is reduced, thereby improving productivity.

With reference now to FIG. 4B, the base cell 10 includes an electrode terminal 11 along a surface of the bare cell opposite to a surface supporting the holder case 20. The electrode terminal 11 is electrically coupled to the protection circuit module 30 by connection tabs 52 and 31.

Figure 6:
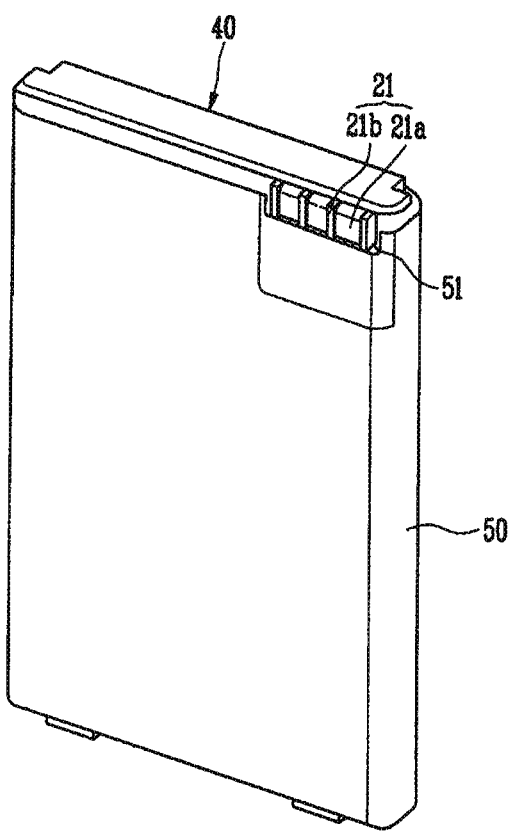
FIG. 6 is a perspective view showing a battery assembly according to still another embodiment of the present invention.

FIG. 6 is a perspective view showing a batter assembly according to an embodiment of the present invention.

Referring to FIG. 6, the top case 40 has a terminal exposure portion 41 for exposing the external input/output terminal portion 21 to cover the protection circuit module 30 further formed outside of the core pack. In addition, the label sheet 50 for covering parts of the exteriors of the core pack and the top case 40 is further formed. A groove portion 51 is formed in a portion of the label sheet that is in contact with the terminal exposure portion 41 so as to expose the external input/output terminal portion 21 to the outside.

The label sheet 50 is used to enforce the coupling force between the core pack and the top case 40. The label sheet 50 may have a shape to partially cover only a joint between the top case 40 and the core pack or may have a single sheet shape to cover the entire exteriors of the top case 40 and the core pack. Herein, the shape of the label sheet 50 is not limited.

The label sheet 50 may be printed with a discharging capacity, a manufacturing date or the like of a secondary battery and may be a packing label sheet including a function to protect or insulate the secondary battery. A material of the packing label sheet may include a synthesis resin, paper, or the like which is typically a packing material, but in one embodiment, has a contraction tub or the ability to be shrink-wrapped.

While this invention has been described in connection with what is presently considered to be practical exemplary embodiments, it is to be understood by those skilled in the art that the invention is not limited to the disclosed embodiments, but, on the contrary, is intended to cover various modifications and equivalent arrangements included within the spirit and scope of the appended claims.

What is claimed is:

1. A battery assembly comprising: a bare cell; a protection circuit module electrically connected to the bare cell and having a first terminal portion;
 a holder case between the bare cell and the protection circuit module, the holder case having a second terminal portion, a terminal connection portion connected to the second terminal portion and an insulating support,
 wherein the protection circuit module is coupled to the holder case such that the first terminal portion is electrically coupled to the terminal connection portion; and
 wherein a pad portion of the protection circuit module is between the terminal connection portion and the insulating support, wherein the pad portion comprises the first terminal portion.

2. The battery assembly of claim 1, wherein the second terminal portion is on the insulating support and the terminal connection portion is spaced from the insulating support.

3. The battery assembly of claim 1, wherein the insulating support comprises a support portion configured to secure the position of the protection circuit module on the insulating support.

4. The battery assembly of claim 1, wherein the protection circuit module has a projection portion configured to secure the protection circuit module to the holder case.

5. The battery assembly of claim 1, further comprising:
 an electrode terminal on the bare cell;
 a first connection tab electrically connecting the protection circuit module to the electrode terminal; and
 a second connection tab electrically connecting the protection circuit module to the bare cell.

6. The battery assembly of claim 5, wherein the holder case and the protection circuit module have an opening, adapted to allow the second connection tab to be welded to the bare cell.

7. The battery assembly of claim 1, wherein the first terminal portion and the terminal connection portion are welded together.

8. The battery assembly of claim 1, wherein the holder case is coupled to the bare cell by an insulating tape.

9. The battery assembly of claim 1, wherein the protection circuit module comprises a flexible printed circuit board.

10. The battery assembly of claim 1, wherein the holder case has a rib extending along each longitudinal edge of a surface of the holder case that contacts the bare cell.

11. The battery assembly of claim 10, wherein the rib extends along only a portion of each longitudinal edge.

12. The battery assembly of claim 10, wherein the protection circuit module further comprises a second connection tab between each rib and between the holder case and the bare cell.

13. The battery assembly of claim 1, further comprising a top case substantially covering the protection circuit module and adapted to expose the second terminal portion.

14. The battery assembly of claim 13, further comprising a label substantially covering the bare cell and the top case.

15. The battery assembly of claim 1, further comprising a positive temperature coefficient member between the electrode terminal and the protection circuit module.

* * * * *